(12) United States Patent
Duerbaum et al.

(10) Patent No.: US 6,711,034 B2
(45) Date of Patent: Mar. 23, 2004

(54) DC-DC CONVERTER AND A REGULATION METHOD FOR THIS DC-DC CONVERTER

(75) Inventors: Thomas Duerbaum, Langerwehe (DE); Reinhold Elferich, Aachen (DE); Georg Sauerlaender, Aachen (DE)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 10/233,451

(22) Filed: Sep. 3, 2002

(65) Prior Publication Data

US 2003/0043599 A1 Mar. 6, 2003

(30) Foreign Application Priority Data

Sep. 4, 2001 (DE) ........................................ 101 43 169

(51) Int. Cl.[7] .............................................. H02M 3/335
(52) U.S. Cl. ........................................... 363/16; 363/97
(58) Field of Search ............................. 363/16, 78, 95, 363/97, 131

(56) References Cited

U.S. PATENT DOCUMENTS 3,886,436 A * 5/1975 Wadlington .................. 323/225
4,535,399 A * 8/1985 Szepesi .......................... 363/41
5,159,541 A * 10/1992 Jain ............................... 363/26
5,986,895 A 11/1999 Stewart et al. ................. 363/16
6,091,616 A * 7/2000 Jacobs et al. ................. 363/127
6,097,614 A * 8/2000 Jain et al. ...................... 363/16
6,320,764 B1 * 11/2001 Jiang et al. .................... 363/17

FOREIGN PATENT DOCUMENTS

EP       0898360 A1      2/1999

* cited by examiner

*Primary Examiner*—Adolf D. Berhane (57) ABSTRACT

A DC—DC converter includes an inverter and a primary-side circuit with a transformer whose secondary-side voltage is rectified by at least one rectifier for generating an output DC voltage. To avoid an asymmetrical load, which is in particular exhibited by a different load of the rectifier elements (power semiconductors), an electrical magnitude of the DC—DC converter is measured. This magnitude may be, for example, a primary-side current, a primary-side voltage at a capacitance, or a secondary-side, rectified voltage. A parameter for the symmetry deviation is calcuted from the measurement of the magnitude. A symmetry regulation arrangement utilizes the drive of the inverter, for example, the duty cycle of the pulse-width modulated voltage produced by the inverter to minimize the parameter for the symmetry deviation. This achieves an even distribution of the power over the secondary rectifier elements.

13 Claims, 7 Drawing Sheets

DC-DC CONVERTER AND A REGULATION METHOD FOR THIS DC-DC CONVERTER

BACKGROUND OF THE INVENTION

1. Field of the Invention

The invention relates to a DC—DC converter, a regulation method for a DC—DC converter, and a switched-mode power supply.

2. Description of the Related Art

DC—DC converters, also denoted converters, are known for converting an input-side DC voltage into an output-side DC voltage. A DC voltage present on the input side is first converted (chopped) into a switched AC voltage, and this AC voltage feeds a circuit comprising the primary side of a transformer. In this way, at least one voltage, which, after rectification, is available as an output DC voltage, is generated on the secondary side of the transformer.

Such DC—DC converters are also known as a decisive assembly of switched-mode power supplies. They comprise a switched-mode power supply input circuit for connection to the electricity power grid and for generating an intermediate circuit DC voltage. The intermediate circuit DC voltage feeds the incorporated DC—DC converter.

Numerous circuits for DC—DC converters are known. They comprise, on the one hand, very simple circuits in which the inverter only consists of a single controlled switch. In these simple circuits, the switched AC voltage is directly fed to the primary side of the transformer, so that the primary-side circuit thus consists of only the primary side of the transformer. On the other hand, also resonant converters are known in which a primary-side circuit is supplied with a switched-mode AC voltage generated by a half-wave bridge or a full-wave bridge, the primary-side circuit being built up from at least one capacitance and at least one inductance, the inductance often not being present as a discrete component, but as the stray inductance of the transformer.

European Patent Application No. EP 0 898 360 discloses a method and a device for controlling a DC rectifier with an AC intermediate circuit. An inverter with a controlled half-wave bridge or full-wave bridge generates an AC voltage which is transformed via a transformer and rectified on the output side. The secondary side of the transformer then comprises a winding with a middle tap, while the output voltage is rectified by two-way rectification. In this publication, the problem is discussed of the saturation of the magnetic flux in the transformer core. To achieve a waveform here which shows the least possible saturation it is proposed that the switched-mode AC voltage generated by the inverter is symmetrical, i.e., that within a predefined time interval, a voltage pulse is generated that is as long positive as it is negative. This publication, however, exclusively discusses a control method and not a regulation of the output voltage. In this case, a converter topology is provided which does not utilize a resonant arrangement.

In resonant converters, it is a known fact that the output voltage is regulated, the drive of the inverter forming the setting variable then. If, for example, a half-wave bridge generates a pulse-width modulated voltage for supplying power to a resonant arrangement mentioned above, the output voltage can be regulated by varying the frequency of the pulse-width modulated voltage, i.e., the closer the switching frequency is to the resonant frequency, the more noticeable is a resonant voltage increase and the higher the (rectified) output voltage is.

U.S. Pat. No. 5,986,895 describes a DC current converter comprising an inverter driven by a pulse-width modulation for supplying power to a resonant circuit in the form of a resonant capacitance and the primary side of a transformer. The secondary-side voltage of the transformer is rectified and filtered at a secondary winding having a middle tap thereby forming two branches each including one diode and each generating a DC output voltage. The output voltage is regulated via the drive of the inverter with variable pulse width. To reduce losses during switching, the current through the resonant circuit is measured and the switching times are selected such that, when a minimum and a maximum frequency are adhered to, switching only takes place when the current reaches a lower threshold value. U.S. Pat. No. 5,986,895 additionally describes the problem of losses during the rectification of asymmetrical output voltages. This problem is solved by the use of secondary-side synchronous rectifiers instead of diodes.

As a matter of fact, secondary-side asymmetries in the paths containing rectifier elements (diodes) form a problem for DC—DC converters. secondary-side asymmetries arise in that, with multipath rectification (for example, by a four-diode bridge or by two single diodes with a winding with a middle tap), the individual branches, and thus the individual rectifier elements, are loaded differently, i.e., different powers, voltages or currents are to be managed. This leads to the fact that when the circuit is designed, the asymmetrically loaded components are to be designed according to their respective maximum load. For example, components are to be dimensioned with a larger, for example, double power dissipation, so that, partially, additional cooling measures are necessary. Also, any output filter for filtering the rectified output voltage needs to be able to process the lower frequency portions (sub-harmonics) resulting from asymmetry and to have a larger structure for this and also for a higher current standing wave ratio.

A reason for such asymmetries may be, for example, tolerances in the stray inductance of the output-side windings or tolerances in the forward voltages of the diodes. Building the circuits for avoiding such asymmetries with the aid of components that have smaller tolerances leads to highly increased cost. Furthermore, the tolerances cannot always be avoided because, for example, the forward voltage of a diode depends on temperature.

SUMMARY OF THE INVENTION

Accordingly, it is an object of the invention to provide a DC—DC converter and a regulation method for a DC—DC converter in which asymmetrical loads of the secondary-side rectifier are avoided to a maximum extent.

This object is achieved by a DC—DC converter comprising an inverter for generating a switched AC voltage, a primary-side circuit supplied with power from the inverter, the primary-side circuit comprising the primary side of a transformer, the transformer having a secondary side including at least one rectifier for generating at least an output DC voltage (Vo), a measuring unit for measuring an electrical magnitude of DC—DC converter, a symmetry calculation unit for calculating, from the measurement, a parameter for the symmetry deviation of the electrical magnitude, and a symmetry regulation unit for changing the drive of the inverter in dependence on the symmetry deviation so that the symmetry deviation is minimized.

According to the invention, asymmetrical loads are avoided in that an electrical magnitude is measured and a symmetry criterion is applied thereto. Accordingly, driving the inverter then provides that it is excited so that the output load is symmetrical.

In the DC—DC converter according to the invention, a measuring arrangement is provided for measuring an electrical magnitude where various primary and secondary-side magnitudes are involved. For example, the primary-side current can be measured by the transformer. Likewise, it is possible to measure the voltage at a primary-side capacitance. A further possibility comprises the measuring of a secondary-side magnitude, preferably the rectified secondary-side voltage. Accordingly, suitable measuring arrangements are sufficiently known to the person of ordinary skill in the art.

A symmetry calculator unit uses the measuring result to calculate therefrom a parameter for the symmetry deviation from the electrical magnitude. Preferably, the waveform of the electrical magnitude is considered here, and for an observation interval, the symmetry thereof is determined, i.e., the deviation from a symmetrical waveform. Various criterions may be used for this, according to which the symmetry is judged and a parameter for the deviation of symmetry is formed.

According to a first further embodiment of the invention, a parameter for the symmetry deviation is formed in which the substantially periodic waveform of the electrical magnitude under consideration, preferably the voltage on a primary-side capacitance, is expressed in a time interval with at least a local minimum and a local maximum of the waveform. A parameter for the symmetry deviation here forms a magnitude that depends on the difference between the values of the respective peak values. "Depends" is here to be understood to mean that the difference between the values can directly express the value for the symmetry deviation, but it is also possible for further mathematical operations to be applied to this value, for example, multiplication by a constant factor.

A further proposal is that a magnitude is given as a parameter for the symmetry deviation, this magnitude being calculated from the different-sized deviations of a maximum and a minimum value from a mean value of the electrical magnitude. The respective deviations (differences) are determined and compared with each other (difference of the values). The parameter for the symmetry deviation is calculated from this difference while, here too, further mathematical operations can be applied.

According to a further proposal, a criterion is used as a parameter for the symmetry deviation, according to this criterion, the waveform of the electrical magnitude is considered, and within a first time interval, an extreme, i.e., a minimum or maximum value is determined. Likewise, an extreme value is determined for a second time interval. A parameter for the symmetry deviation can be calculated from the difference between the extreme values. This parameter is particularly suitable for considering a rectified magnitude, for example, of the secondary-side rectified voltage. Maximum values in successive time intervals, preferably in the excitation intervals of the pulse width modulated switched AC voltage, are a parameter for the power transferred via the respective branch of the rectifier. A deviation of the extreme values of the two time intervals considered is thus a parameter for asymmetrical load.

It is generally possible for the symmetry calculator unit to first calculate an intermediate magnitude from the measured magnitude. For example, by integrating the current at a capacitance, an intermediate value, whose waveform corresponds to that of the voltage at the capacitance, can be determined at a capacitance over time. The criterions indicated for determining the symmetry deviation, can then be used for this intermediate magnitude.

In addition, more criterions may be found which are suitable as a parameter for the symmetry deviation. A person of ordinary skill in the art will choose the most favorable criterion as regards cost and requirements for a particular application.

The symmetry deviation determined thus is applied, according to the invention, to a symmetry regulation device which predefines the drive of the inverter so that the symmetry deviation is regulated to zero. It has turned out that an even load of the output rectifiers is achieved, i.e., better or worse depending on the criterion used, by regulating the electrical magnitude in a way that a symmetrical waveform is achieved relative to the respective criterion used. Even with components that have relatively large tolerances, it is possible to attain an even load of the output rectifier.

In a preferred embodiment of the invention, the inverter is driven so that it produces a pulse-width modulated AC voltage. This is understood to mean an AC voltage which is featured by a switching frequency and a duty cycle, while within each time interval whose duration is determined by the switching frequency, first a positive and then a negative voltage pulse is generated (full-wave bridge) or first a positive voltage pulse and then a zero output voltage is generated for a period of time (half-wave bridge). The duration of the positive voltage pulse is predefined by the duty cycle (ratio of the duration of the positive voltage pulse to the total time of the interval) and the duration for which the voltage is zero or negative is predefined by the rest duration of the interval. The symmetry regulation device here preferably uses the duty cycle as a setting quantity to regulate the symmetry deviation to zero, i.e., to achieve a symmetrical waveform of the electrical magnitude relative to the respective symmetry parameter.

A symmetry regulation device that respectively predefines the duty cycle can be combined in a simple manner with a conventional known regulation device for regulating the output voltage. The output regulation device can then regulate, for example, the output voltage and predefine the frequency of the pulse width modulated AC voltage in known manner, whereas, the symmetry regulation device predefines the duty cycle. In this way, a DC—DC converter can be arranged for producing a regulated DC output voltage while the power semiconductors (rectifiers), the transformer and the output filters, as required, can be utilized optimally.

A symmetry regulation device and a symmetry calculator unit are understood to mean purely functional units, i.e., in an actual device, such units need not of necessity be separate assemblies. A symmetry calculator unit as well as a symmetry regulation device can be realized as an analog circuit. A person of ordinary skill in the art is familiar with respective circuits for making mathematical calculations (for example, difference formation, multiplication by a constant, averaging, integration, etc.). Also analog circuits for realizing a regulation device are known, such as a simple proportional regulator or a PID regulator. Alternatively, symmetry calculator unit and/or the symmetry regulation device may also be realized as a discrete or integrated digital circuit, or completely or in part designed as a program running on a microprocessor or signal processor.

In an actual realization, it is also possible to realize, in one assembly, both the symmetry regulation device according to the invention and a known output regulation device for the regulation of the output voltage.

These and other aspects of the invention are apparent from and will be elucidated with reference to the embodiments described hereinafter.

DESCRIPTION OF THE PREFERRED EMBODIMENTS

Figure 1:
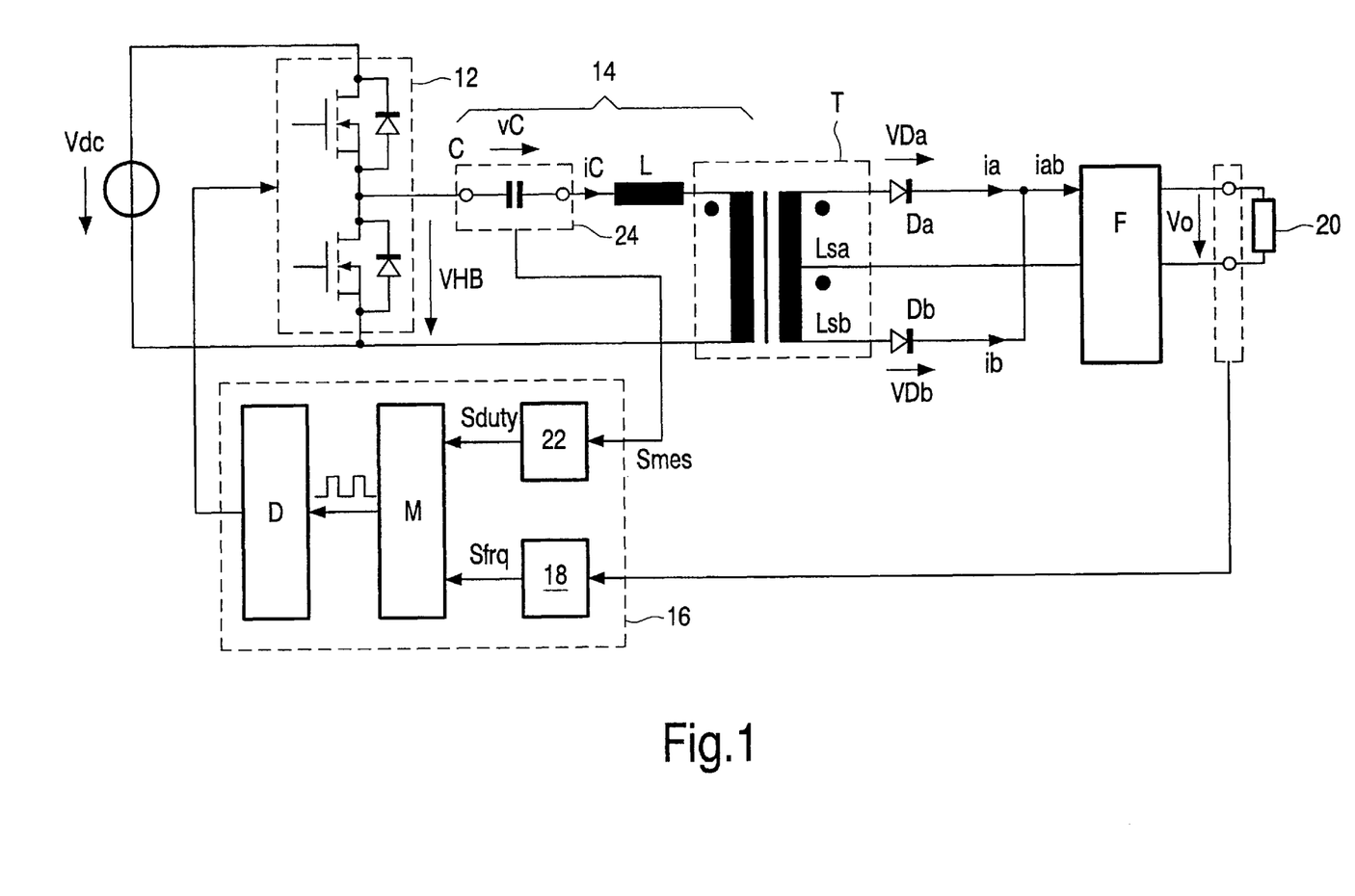
FIG. 1 shows a circuit diagram of a first embodiment of a DC—DC converter according to the invention.

FIG. 1 shows a partially schematic circuit diagram of a DC—DC converter 10. It comprises an inverter 12 supplied with power by a DC voltage source Vdc, the inverter being arranged as an asymmetrically switching half-wave bridge. The switched AC voltage vHB__generated by the inverter 12 feeds a resonant arrangement 14 including, in series, a resonant capacitance C, an inductance L and the primary side of a transformer T. The inductance L can, in addition to being represented by a discrete component, also be represented by the primary-side stray inductance of the transformer T.

On the secondary side, the transformer T has two secondary windings Lsa, Lsb arranged as a single winding with a middle tap. Two power semiconductors (diodes) Da, Db are connected to the ends of the secondary winding, so that, altogether, a two-way rectification is effected on the secondary side with two rectifier elements. The rectified voltage is filtered in a filter F to provide an output voltage Vo for application to a load 20. Embodiments of filter circuits F have long since been known to the expert. Examples comprise capacitive, inductive or combined output filters F.

The inverter 12 has two controlled switches, normally arranged as field-effect transistors. These switches are driven by a half-wave bridge driver D which receives a control signal (pulse signal) from a modulator M. Driver D and modulator M are part of a measuring and regulator arrangement 16. The control signal then directly predefines the position of the switches of the half-wave bridge of the inverter 12, i.e., with a High level of the control signal, the upper switch is closed and the lower switch is open, and with a Low level of the control signal, the lower switch is closed and the upper switch is open. Depending on the position of the switches, there is a voltage vHB of +Vdc or zero present on the resonant circuit 14.

The drive by the modulator M and the driver D is effected in the way that the output voltage of the inverter 12 is a pulse-width modulated voltage. The waveform of the pulse width modulated voltage vHB is shown at the top in FIG. 2. In a time interval of duration $T_{ges}$, the pulse-width modulated voltage has a positive voltage pulse of duration $T_A$ and a waveform of duration $T_B$, during which there is a zero voltage. The waveform of such a pulse-width modulated voltage can be unambiguously determined by setting the switching frequency $f=1/T_{ges}$ and the duty cycle $\delta=T_A/T_{ges}$. This is, of course, an idealized waveform. In practice, the generated pulses, i.e., on the basis of finite edge steepness, rather have a trapezoidal form. To avoid short-circuits, dead times are additionally used between the pulses.

The output voltage Vo is regulated in a manner known per se while an increase of resonance is used. For this purpose, the regulation device 16 comprises an output regulator 18 (PID regulator). A measuring device measures the output voltage Vo at the load terminals and supplies same to the output regulator 18. Furthermore, although not shown, the set value of the output voltage Vo is applied to the output regulator 18. The output regulator 18 predefines, via the signal Sfrq, the switching frequency of the switches of the inverter 12 and, thus, the pulse-width modulated voltage to the modulator M. Inverter 12 is then always operated at a switching frequency that is clearly above the known resonant frequency/frequencies of the resonant arrangement 14. By reducing the frequency. i.e.. a respective signal Sfrq, the output voltage Vo can consequently be increased and vice versa. In this way, the output regulator 18 produces the setting signal Sfrq by which the voltage Vo is regulated to the set value.

The regulation device 16 further includes a unit 22 which comprises a symmetry calculator unit and a symmetry regulator. Such a unit 22 is represented, in general, in FIG. 4 in the form of a block circuit diagram.

Figure 4:
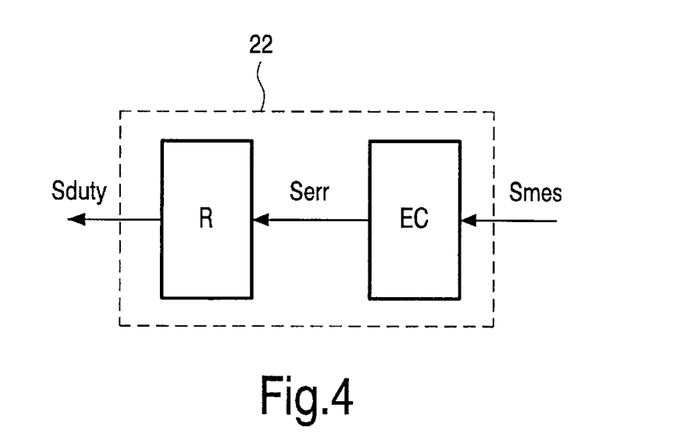
FIG. 4 shows a block circuit diagram of a general symmetry calculator unit and of a symmetry regulation unit.

As shown in FIG. 4, the unit 22 comprising a symmetry calculator unit EC and a symmetry regulator R takes up a measuring signal Smes that has an electrical magnitude. The symmetry calculator unit EC determines, from the measuring signal Smes, a parameter for the deviation of the waveform of Smes from a waveform that is symmetrical in accordance with a symmetry criterion. To obtain as symmetrical a waveform as possible, this parameter is minimized, i.e., the parameter determined for the deviation Serr is treated as a regulation error to be cancelled and applied to the symmetry regulator R. Via the duty cycle, which is predefined as signal Sduty by the symmetry regulator R, Smes is regulated in such a way that it satisfies, in the best way possible, the symmetry criterion used by the symmetry calculator unit EC, and Serr is minimized.

Depending on the arrangement, various electrical magnitudes of the circuit are considered which may be measured and applied as a measuring signal Smes to the unit 22. This includes primary-side magnitudes with which a measuring unit 24 as shown in FIG. 1 captures the primary-side current iC or the voltage vC on the primary-side capacitance C and applies the same as a measuring magnitude Smes to the unit 22. As explained hereafter, it is also possible that secondary-side magnitudes are considered.

A symmetry criterion is used for the primary-side measuring magnitudes, this criterion looking at the periodic waveform of the magnitude and deriving a parameter for the symmetry by a comparison of maximums and minimums. In general the symmetry deviation Serr determined by this criterion can be written as:

$$\text{Serr}=\text{const}^* \left( \max(\text{Smes}) + \min(\text{Smes}) - 2 \cdot \text{av}(\text{Smes}) \right)$$

where

Smes is the measured electrical magnitude, const is a measuring or gain constant, the operations max( ) and min( ) produce the respective maximum or minimum of the magnitude Smes considered within the respective interval. (At least one period of the signal should be used here as a measuring interval. Since a change of the waveform from one period to another, however, may be considered small, maximum and minimum can also be determined over a number of successive periods), and the operation av( ) produces the temporal mean value, i.e., the DC component of the magnitude under consideration.

Figure 5:
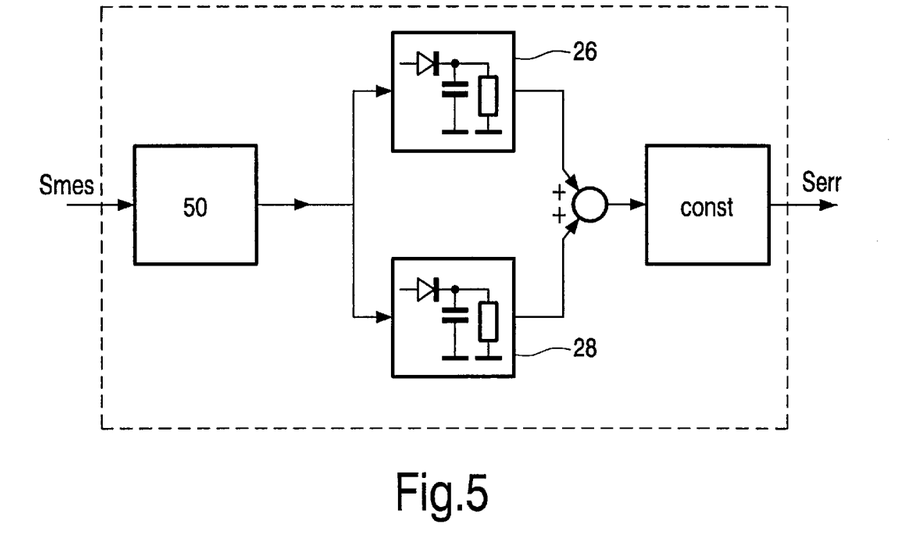
FIG. 5 shows a schematic circuit diagram of a symmetry calculator unit.

FIG. 5 shows the structure of the symmetry calculator unit EC. The measuring signal Smes is first subjected to a preprocessing operation in general represented by the box 50. This is an input filter which can, for example, remove the DC component from Smes. Depending on the arrangement, the filter 50 may, however, also be omitted or also execute other operations. The filtered signal is applied to a maximum unit 26 and a minimum unit 28 which determine the maximum and minimum of the value, respectively. The symbolic representations of FIG. 5 refer to analog circuits having this function. Obviously, digital arrangements are also conceivable.

The values of maximum and minimum are subtracted (since it is assumed in FIG. 5 that the minimum has a negative value, a simple addition will do). After multiplication by the measuring constant const, an error signal Serr results which represents a parameter for the symmetry deviation.

Figure 6:
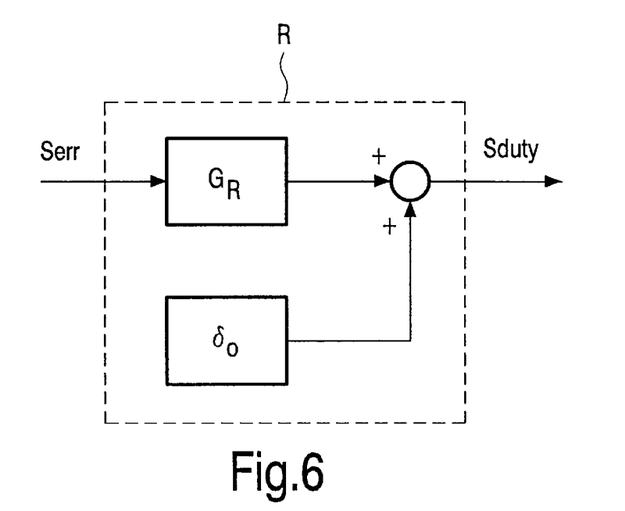
FIG. 6 shows a schematic circuit diagram of a symmetry regulation unit.

FIG. 6 shows the structure of the regulator R to which the symmetry deviation Serr is applied as an error parameter to be regulated. For the predefinition of the duty cycle controlled by Sduty, the regulator R uses a predefined value $\delta_0$ of, for example, 50%. A regulator $G_R$, for example, a PID, PI or only I-regulator, adds a (positive or negative) deviation from the basic setting $\delta_0$ in dependence on Serr. Based on the I-portion of the regulator $G_R$, a non-disappearing contribution is added to $\delta_0$ even with disappearing Serr, so that the accuracy of the preset value $\delta_0$ does not have any influence on the result of the regulation.

The signal Sduty, predefined by the symmetry regulator R within the unit 22, is applied to the modulator M which, in dependence thereon, applies a pulse signal to the driver D to drive the half-wave bridge 12, while the duty cycle of the thus generated pulse-width modulated voltage vHB corresponds to the predefined value Sduty.

Figure 2:
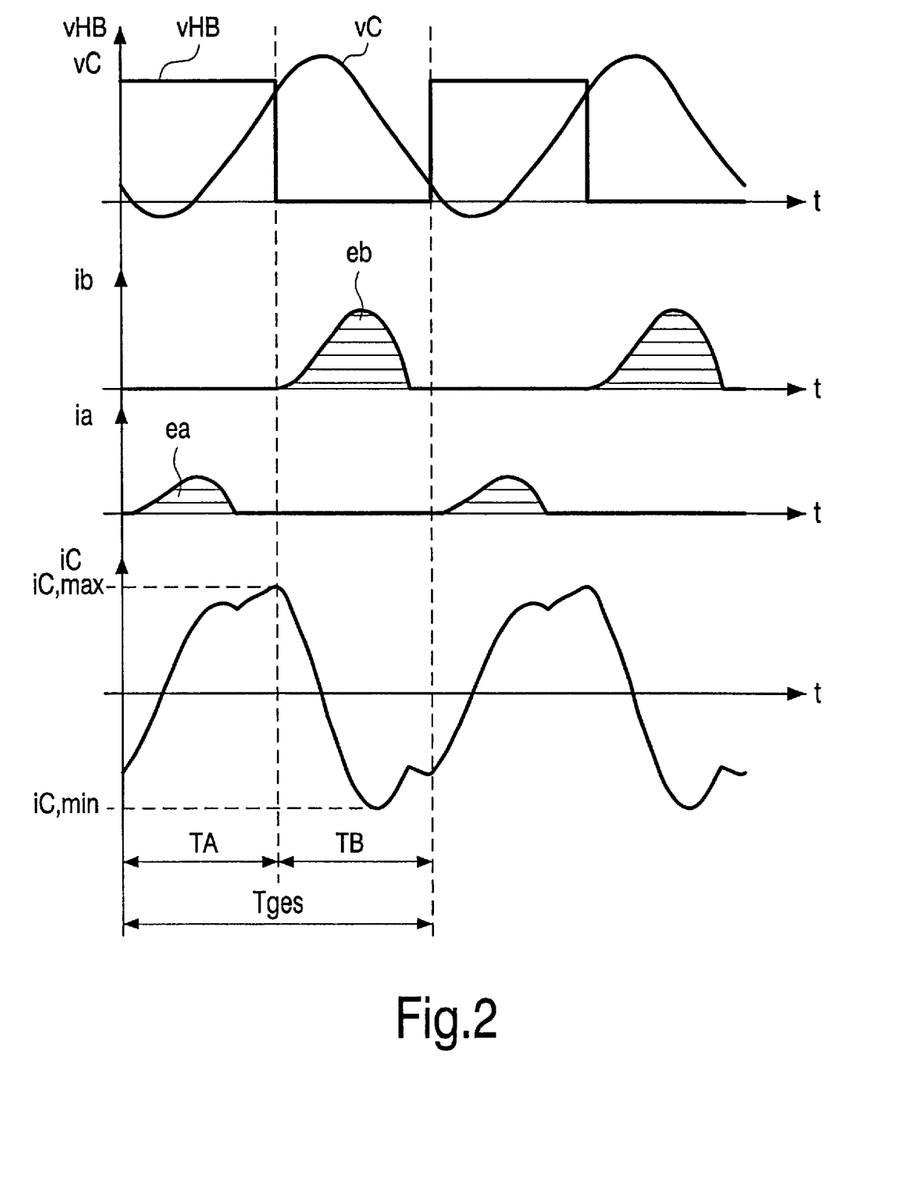
FIG. 2 shows a diagram of the waveform of electrical magnitudes in FIG. 1.

FIG. 2 shows the waveform of various electrical magnitudes of the DC—DC converter of FIG. 1. It comprises not only the pulse-width modulated voltage vHB and the primary-side current iC, but also the voltage vC on the capacitance C as well as the secondary-side currents ia, ib via the rectifier diodes Da, Db. FIG. 2 shows the case of an asymmetrical load. As shown in FIG. 2, a clearly smaller power ia (integrally via the current) flows across the first rectifier element Da in each time interval $T_{ges}$, and a clearly larger power ib flows across the second rectifier element Db. This is the asymmetrical load mentioned above which, with the design of, for example, the diodes Da, Db mentioned above, leads to the fact that with respect to their relatively high power loss (cooling, etc.), they have to have a considerably higher value than would actually be necessary, since in the design, always the worst case scenario of the (asymmetrically) higher load for each of the diodes is taken as the starting point.

Hereafter, three examples will be described for measured primary-side magnitudes and application of the general symmetry criterion for these magnitudes described above.

A first proposal for a symmetry criterion relates to the waveform of the voltage vC on the primary-side capacitance C. The waveform of the this voltage vC is approximately sinusoidal as is shown in FIG. 2. As explained above, there is a comparison of the maximums and minimums of the temporal waveform.

Figure 3:
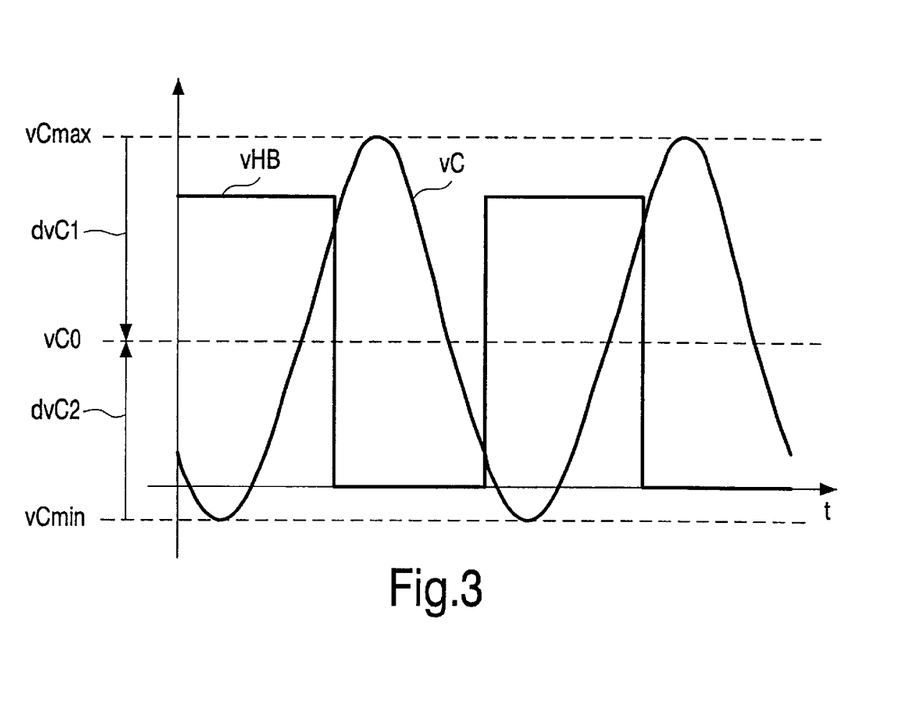
FIG. 3 shows a second diagram of the waveform of electrical magnitudes in FIG. 1.

The respective magnitudes are individually shown in FIG. 3. The voltage vC varies between the maximum value vCmax and the minimum value vCmin around its temporal mean value vC0. The deviation of the "height" of the maximum above the temporal mean value or of the minimum below this mean value, respectively, is substantial to the symmetrical load of the total circuit. The respective magnitudes are shown in FIG. 3 as dvC1 and dvC2. As a measure for the symmetry deviation, the difference of the values from dvC1 and dvC2 is used.

$$\text{Serr}=\text{const}^*((\text{vCmax}-\text{vC0})+(\text{vCmin}-\text{vCo})).$$

The respective first embodiment of a DC—DC converter of FIG. 1 comprises a measuring arrangement 24 which detects the voltage vC on the capacitance C. The symmetry calculator unit EC of the first embodiment is arranged in accordance with FIG. 5 and includes, in the filter 50, a unit for forming and subtracting the temporal mean value of vC. Corresponding circuits or corresponding algorithms for this, respectively, are widely known. In this way, the above expression is simplified because only the AC component ac(vC) is present, so that the subtraction of vCo can be omitted.

The symmetry calculator unit EC further comprises a circuit or an algorithm, respectively, to evaluate the above expression and respective calculation of Serr. The regulation by the respective regulator $G_R$ is made with the predefined value that with a value Serr>0, the duty cycle is reduced, and with Serr<0, the duty cycle is increased.

In a second embodiment, the waveform is shown of the primary-side current iC which is measured by a current sensor 24 and applied to the calculator unit 22.

The second proposal for the symmetry criterion used by the symmetry calculator unit EC will be explained with reference to the waveform for the current iC, this waveform being shown at the bottom of FIG. 2. As can be seen, the waveform of the primary-side current iC is periodic with the excitation frequency. It is an undulating waveform with minimums and maximums, but no pure sinusoidal oscillation. To form a measure for the symmetry deviation, the minimum and maximum value of the waveform of iC is determined in the excitation interval $T_{ges}$. As a parameter for the symmetry deviation, the difference of the absolute values of the maximum and minimum values is used. A subtraction of the mean values (DC component) may be omitted because the current through a capacitance has no DC component.

Thus, the symmetry deviation is calculated by:

$$\text{Serr}=\text{const}^*(\text{Imax}+\text{Imin}).$$

The symmetry deviation is settled in that with Serr>0, the duty cycle is increased, and with Serr<0, the duty cycle is reduced.

Structure and way of operation of the unit 22 of the second embodiment correspond to FIG. 5. The symmetry calculator unit EC processes measuring values iCmes of the current sensor 24 for the primary current iC. The second embodiment of a symmetry calculator unit EC uses a somewhat simplified symmetry criterion for the waveform of the magnitude under consideration, here iCmes via the comparison of the values of minimum and maximum without a DC component. Accordingly, also the conversion, from a point of view of circuitry (for example, as an analog circuit) or from a point of view of programming (when a regulation algorithm is used), is a little less expensive. Experiments have shown that a primary-side current iC symmetrically regulated with respect to this criterion leads to an improved symmetrical load of the outputs, here, particularly, the output diodes Da, Db. Yet the first proposal is preferred (taking the voltage vC into consideration), since even better results were achieved there. Also, the measurement is often simpler because, in general, voltages can be measured at less cost than currents. For an actual application, the person of ordinary skill in the art will have to decide which embodiment is used based on requirements. Taking the current iC into consideration is advantageous, for example, if this current is already being measured for other purposes.

In accordance with a third proposal, the general symmetry criterion is used for an intermediate magnitude calculated from the primary-side current iC. First of all, a signal int(iC) is formed as an intermediate magnitude by temporal integration of the current iC, this signal int(iC), as regards its waveform, corresponding to vC. Represented as a formula, Serr is calculated as follows:

$$Serr = const^*$$

where int(iC) is the temporal integral of the measuring magnitude iC, max ( ) is the maximum in an interval under consideration, and av ( ) is the temporal mean value of the magnitude under consideration, here iC. Also, this expression can be simplified by removing the DC component of the magnitude iC under consideration, as explained above.

Accordingly, also in a third embodiment, the DC—DC converter has the structure of FIG. 1. However, the unit 22 now includes a symmetry calculator unit EC (not shown) with respective units for evaluating the above expressions which are known to the person of ordinary skill in the art. The formation of intermediate magnitude int(iC) by integration can be effected by the input filter 50. The regulation by the downstream regulator R is effected with the predefined value that, for Serr>0, the duty cycle is reduced, and for Serr<0, the duty cycle is increased.

In the first to the third embodiments explained above, primary-side magnitudes were measured and the general symmetry criterion was applied to them. However, also secondary-side magnitudes may be considered. With the circuit according to FIG. 1, the waveform of the secondary-side magnitudes is substantially determined by the rectification. Therefore, another symmetry criterion is applied here which comprises the comparison of the height of the successive maximums. Depending on the respective use and magnitude considered, additional operations may be applied, as is shown in the following examples.

Figure 7:
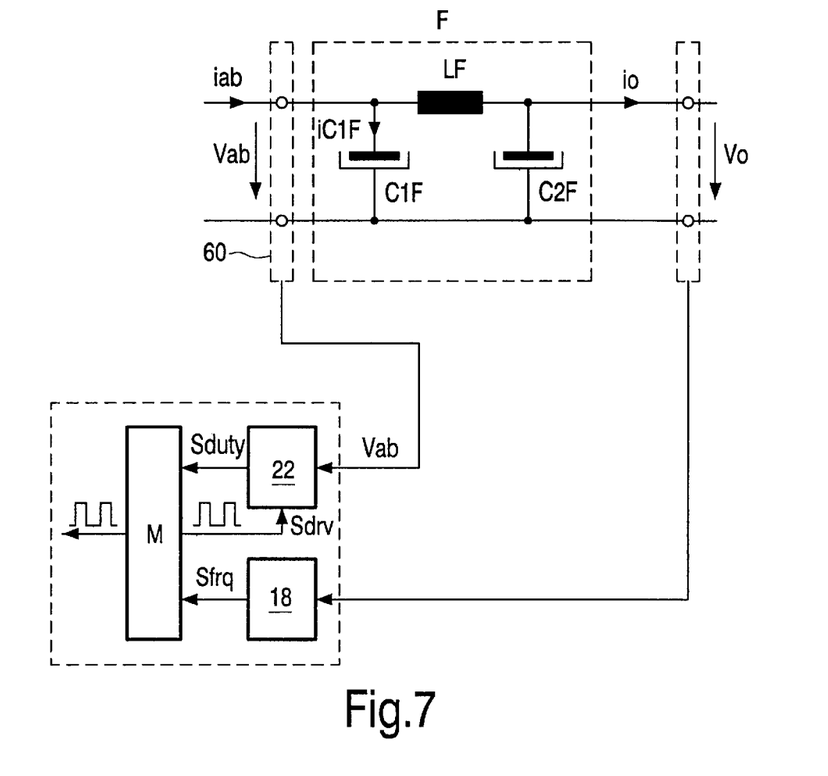
FIG. 7 shows a circuit diagram of a part of a fourth embodiment of a DC—DC converter according to the invention.

FIG. 7 shows a part of a fourth embodiment of a DC—DC converter. FIG. 7 only shows the output filter F, the rest of the DC—DC converter having the same structure as that shown in FIG. 1. This is the reason why the structure and the function of the corresponding parts are not further discussed here.

The filter F is arranged as a Pi filter, comprising a capacitance C1F, inductance LF and a further capacitance C2F. A current iC1F flows via the capacitance C1F. The input voltage of the filter is referred to as Vab, and the output voltage as Vo.

Figure 9:
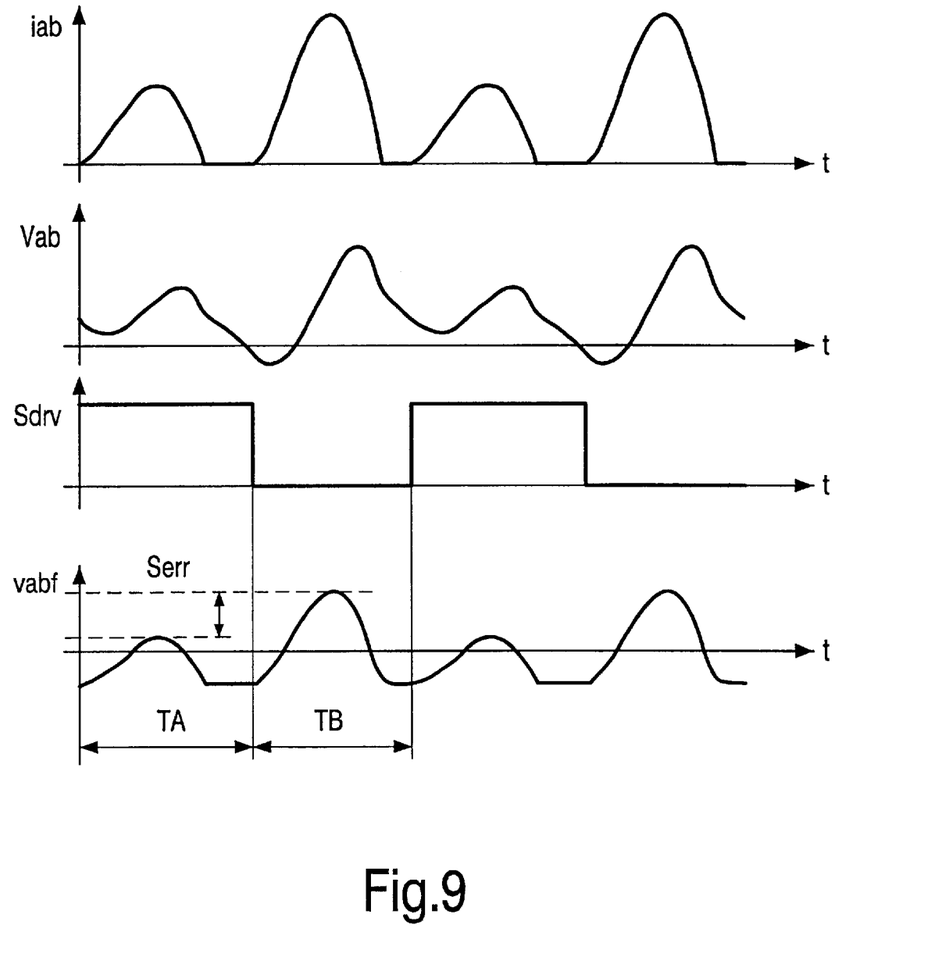
FIG. 9 shows a diagram of the waveform of electrical magnitudes of the circuit shown in FIG. 7.

The waveforms of the electrical magnitudes of FIG. 7 are shown in FIG. 9. The current iab corresponds, in essence, to the current iC1F as a result of the filter operation of LF. The voltage Vab shows a considerable undulation because the capacitor has non-disappearing values for series inductance and series resistance (not shown).

In FIG. 9, the waveform of iab shows an asymmetrical load of the output rectifier Da, Db. Successive maximums alternately have different values, which, in the two-way two-diode rectification, shows the asymmetrical spreading of power over the two rectifier elements Da, Db.

In FIG. 9, a voltage Sdrv is shown which, as a switching signal, corresponds to the pulse signal generated by the modulator M, as is shown in FIG. 7. The voltage Sdrv is used as a switching signal to distinguish the time interval TA from the time interval TB (excitation interval of the pulse width modulated voltage vHB). Within this interval TA, TB, the waveform of the voltage Vab is considered to obtain therefrom a parameter for the symmetry deviation.

Figure 8:
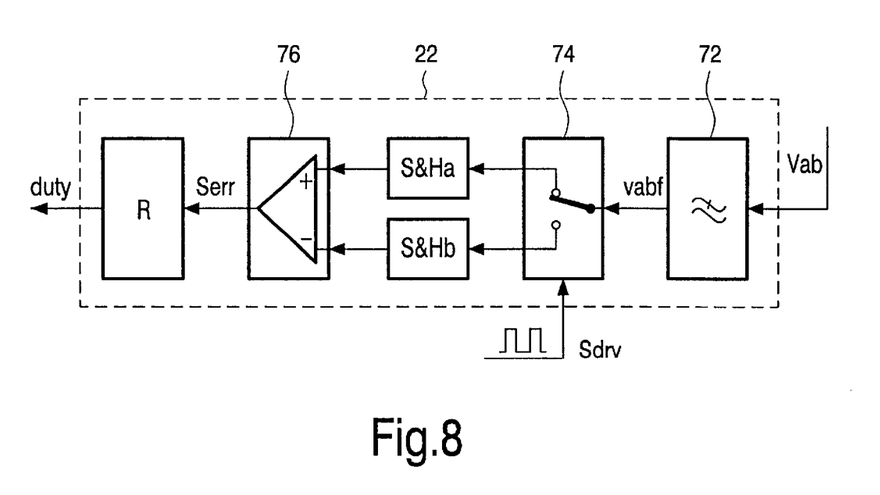
FIG. 8 shows a schematic circuit diagram of a symmetry calculator unit and a symmetry regulation device.

The structure of the respective unit 22 is shown in FIG. 8. The voltage Vab measured by a voltage measuring arrangement 60 is applied to the unit 22 and is filtered by an RC low-pass filter 72 to obtain the voltage vabf. Depending on the status of the signal Sdrv, a switching unit 74 applies the voltage vabf to a first sample-and-hold circuit S&Ha or to a second sample-and-hold circuit S&Hb. The first sample-and-hold circuit S&Ha is allocated to the first excitation interval TA, and the second sample-and-hold circuit S&Hb is allocated to the second excitation interval TB. A peak value is determined by means of the sample-and-hold circuits S&Ha, S&Hb within the respective considered intervals. The downstream comparator 76 generates an error signal Serr which is applied to the regulator R. The regulator R regulates the error signal Serr by predefining the duty cycle by means of the signal Sduty, where it increases the duty cycle when Serr>0, and reduces the duty cycle when Serr<0.

The relevant magnitudes in this method for determining a symmetry deviation, are shown at the bottom in FIG. 9. The low-pass filtered voltage vabf has a maximum within the first excitation interval TA, which is featured by the lower dotted line. The waveform of vabf shows a higher maximum within the second excitation interval TB, this higher maximum being featured by the upper dotted line. The symmetry deviation is given by the signal Serr, indicated by the two-way arrow between the dotted lines.

A fifth embodiment of a DC—DC converter (not shown) utilizes the secondary current iab. The heights of successive maximums are compared for respective successive excitation intervals TA, TB. For this purpose, a unit 22 as shown in FIG. 8 is used, from which, however, the input filter 72 is omitted.

Figure 10:
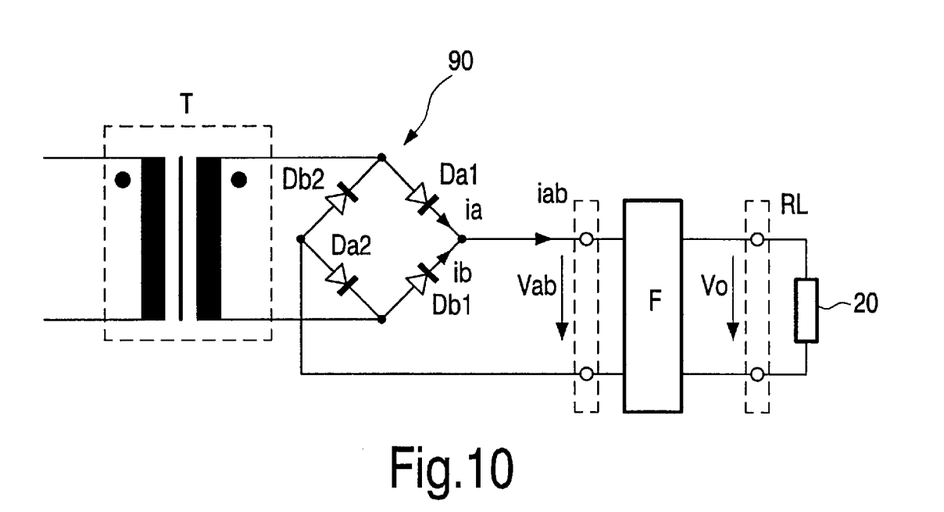
FIG. 10 shows a circuit diagram of a part of a fifth embodiment of a DC—DC converter according to the invention.

FIG. 10 shows a part of a sixth embodiment of a DC—DC converter. Only the transformer T is shown here with a secondary-side circuit, the rest the structure corresponding to that of FIG. 1.

In FIG. 10, the transformer T comprises a single secondary winding. Here a rectifier 90, for example, a commercially available bridge rectifier, is used. Rectification is effected with the aid of a full-wave bridge with four rectifier elements Da1, Da2, Db1, Db2. Accordingly, the rectified voltage Vab shows the typical waveform of a voltage rectified by a full-bridge. Also, in the sixth embodiment, an output filter F is arranged upstream of the load 20.

Also, the sixth embodiment of the DC—DC converter includes a measuring unit for detecting an electrical magnitude, a symmetry calculator unit and a symmetry regulation unit (none of them shown). Here, the same magnitudes and symmetry criterions are involved as in the embodiments shown above, to obtain a symmetrical load of the rectifier elements Da1, Da2, Db1, Db2. In the sixth embodiment comprising one bridge rectifier, the secondary-side magnitudes ia, ib, iab, vab, in essence, show a waveform as shown in FIG. 9. A difference is that different output-side inductances are omitted here as an error source for asymmetry. Disturbances of symmetry as a result of different diode voltages may, however, double in the worst case.

To effect the regulation in accordance with the invention with the object of a symmetrical load, also secondary-side non-rectified magnitudes can be measured in addition to the measuring magnitudes and symmetry criterions explained above with reference to the other embodiments. The symmetry criterions indicated above with reference to the first to third embodiments (comparison of maximum and minimum) can be used.

In FIG. 1, the DC voltage supply Vdc is symbolically shown as a voltage source. In a switched-mode power supply (not shown), Vdc is the intermediate circuit voltage of the switched-mode power supply, this voltage being delivered by a power supply input circuit. A power supply input circuit is used for connection to an AC voltage supply, for example, the electricity power grid. In order to generate an intermediate circuit DC voltage Vdc, the input AC voltage is rectified and filtered, depending on requirements in the manner known to a man of ordinary skill in the art.

The invention can, in this respect, be summarized in that a DC—DC converter, a regulation method for a DC—DC converter and a switched-mode power supply are proposed. The DC—DC converter comprises an inverter and a primary-side circuit with a transformer whose secondary-side voltage is rectified to generate an output DC voltage with at least one rectifier. To avoid an asymmetrical load which particularly exhibits itself in a different load of the rectifier elements (power semiconductors), an electrical magnitude of the DC—DC converter is measured. This magnitude may be, for example, the primary-side current, a primary voltage on a capacitance or a secondary-side, rectified voltage. A parameter for the symmetry deviation, for which various methods of symmetry measurements are proposed, is obtained from the measurement of the magnitude. A symmetry regulation unit utilizes the drive of the inverter, for example, the duty cycle, the pulse-width modulated voltage delivered by the inverter to minimize the value of the symmetry deviation. This achieves an even spreading of the power over the secondary-side rectifier elements.

What is claimed is:

1. A DC—DC converter comprising:

an inverter for generating a switched AC voltage;

a primary-side circuit coupled to said inverter for receiving said switched AC voltage, said primary-side circuit including a primary side of a transformer, said transformer having a secondary side including at least one rectifier for generating at least an output DC voltage;

a measuring unit for measuring an electrical magnitude of the DC—DC converter;

a symmetry calculation unit for calculating, from the measured electrical magnitude, a parameter for a symmetry deviation of the electrical magnitude; and a symmetry regulation unit for changing a drive of the inverter in dependence on the calculated parameter for the symmetry deviation so that the symmetry deviation is minimized.

2. The DC—DC converter as claimed in claim 1, in wherein the DC—DC converter further comprises means for driving the inverter so that the inverter supplies a pulse-width modulated voltage, and wherein the symmetry regulation device regulates the driving means to control the duty cycle of the pulse width modulated AC voltage whereby the symmetry deviation goes to zero.

3. The DC—DC converter as claimed in claim 1, wherein the primary-side circuit is a resonance arrangement comprising at least one capacitance.

4. The DC—DC converter as claimed in claim 1, wherein the measuring arrangement measures a primary-side current at the transformer.

5. The DC—DC converter as claimed in claim 3, wherein the measuring arrangement measures a voltage (vC) at the primary-side capacitance.

6. The DC—DC converter as claimed in claim 1, wherein the measuring arrangement measures a rectified secondary-side electrical magnitude.

7. The DC—DC converter as claimed in claim 1, wherein the symmetry calculation unit calculates an intermediate magnitude from the measured electrical magnitude.

8. The DC—DC converter as claimed in claim 1, wherein the symmetry calculation unit calculates a magnitude as a parameter for the symmetry deviation, said magnitude depending on a difference between a negative and a positive peak value of at least one of the electrical magnitudes.

9. The DC—DC converter as claimed in claim 1, wherein the symmetry calculation unit produces a magnitude as a parameter for the symmetry deviation, said magnitude being calculated from a difference between values of a deviation of a maximum of at least one of the electrical magnitudes from a mean value of the electrical magnitude, and a deviation of a minimum of at least one of the electrical magnitudes from the mean value of the electrical magnitude.

10. The DC—DC converter as claimed in claim 1, wherein the symmetry measuring arrangement calculates a magnitude as a parameter for the symmetry deviation in accordance with the following expression:

$$S\mathit{err} = \mathit{const}* (\max(ac(S\mathit{mes})) + \min(ac(S\mathit{mes})))$$

where Serr is the magnitude, const is a constant factor, max( ) is a function for determining a temporal maximum value, min( ) is a function for determining a temporal minimum value, ac( ) is a function for determining a signal value without a DC component, and Smes is a measured electrical magnitude.

11. The DC—DC converter as claimed in claim 1, wherein the symmetry measuring unit calculates a magnitude as a parameter for the symmetry deviation from a difference between values of a first extreme of an electrical magnitude within a first time interval, and of a second extreme of the electrical magnitude within a second time interval.

12. A switched-mode power supply comprising:

a power supply input circuit for connection to a voltage supply and for generating an intermediate circuit DC voltage; and a DC—DC converter as claimed in claim 1 coupled to receive the intermediate circuit DC voltage.

13. A method for regulating a DC—DC converter, said method comprising the steps:

generating a switched AC voltage from an applied DC voltage;

applying the switched AC voltage to a primary-side circuit comprising the primary side of a transformer;

rectifying a voltage induced on the secondary side of the transformer to form at least one output DC voltage;

measuring an electrical magnitude of the DC—DC converter; calculating a parameter for a symmetry deviation of the electrical magnitude; and regulating a drive of the inverter so as to minmize the symmetry deviation of the electrical magnitude.

* * * * *

UNITED STATES PATENT AND TRADEMARK OFFICE
CERTIFICATE OF CORRECTION

PATENT NO.   : 6,711,034 B2
DATED        : March 23, 2002
INVENTOR(S)  : Thomas Duerbaum et al.

It is certified that error appears in the above-identified patent and that said Letters Patent is hereby corrected as shown below:

<u>Title page,</u>
Item [73], Assignee, after "Koninklijke" change "Phillips" to -- Philips --.

Signed and Sealed this

Sixth Day of July, 2004

JON W. DUDAS
*Acting Director of the United States Patent and Trademark Office*